Patented Feb. 10, 1948

2,435,809

UNITED STATES PATENT OFFICE 2,435,809

PROCESS OF PREPARING NICOTINAMIDE

Jacob van de Kamp, Westfield, and Max Tishler, Rahway, N. J., assignors to Merck & Co., Inc., Rahway, N. J., a corporation of New Jersey No Drawing. Application May 3, 1944,
Serial No. 533,951

1 Claim. (Cl. 260—295.5)

This invention relates to improvements in processes for preparing chemical compounds, specifically methods for obtaining the pellegra-preventive factor nicotinamide, which is the amide of pyridine-3-carboxylic acid amide, also known as nicotinamide.

Heretofore nicotinamide has been prepared by reacting ammonia with nicotinic acid or an ester thereof, the nicotinic acid being obtained usually by oxidation of nicotine preferably, or quinoline or β-picoline.

In accordance with this invention, it is now found that nicotinamide can be prepared in commercially satisfactory yields from materials now more easily available than are the raw materials above mentioned. The process according to this invention can be represented as follows:

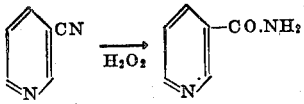

The β-cyanopyridine which is treated with hydrogen peroxide to form nicotinamide in the process according to the present invention can be prepared by reacting β-bromopyridine with copper cyanide or by reacting sodium pyridine-β-sulfonate with sodium cyanide.

It is remarkable that hydrogen peroxide reacts with β-cyanopyridine as above indicated to produce nicotinamide because the nitrogen atom of the heterocyclic nucleus has properties characteristic of the nitrogen atom of a tertiary amino compound, with which it is known that hydrogen peroxide reacts to form an amine oxide according to the general reaction:

$$R_3N + H_2O_2 \rightarrow R_3N{:}O + H_2O$$

Perbenzoic acid also reacts in this manner with tertiary amines to form amine oxides and it is known that this reagent reacts with pyridine, quinoline, and isoquinoline to form the corresponding amine oxides. Per-acetic acid behaves in like manner. In view of these facts, it would be expected that hydrogen peroxide, instead of producing nicotinamide by reaction with β-cyanopyridine, would yield the corresponding amine oxide:

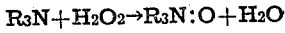

Furthermore certain nitriles when treated with either alcoholic potassium hydroxide or hydrogen peroxide yield corresponding acid amides, but β-cyanopyridine when treated with alcoholic potassium hydroxide yields potassium nicotinate, not the expected nicotinamide. The reaction forming the subject matter of this invention accordingly is remarkable in view of this anomalous behavior of β-cyanopyridine toward alcoholic potassium hydroxide because it would not be expected that hydrogen peroxide would react with β-cyanopyridine to give nicotinamide.

In practicing the process according to this invention, an alkaline aqueous solution of β-cyanopyridine is treated with an aqueous solution of hydrogen peroxide. The treatment results in an exothermic chemical reaction during which gaseous oxygen is liberated, and the reaction product nicotinamide is recovered from the reaction mixture, preferably by neutralization and subsequent formation of the sparingly soluble nicotinamide mercuric chloride complex. The amide per se is obtainable from the complex by treatment of an alkaline methanol solution of the complex with hydrogen sulfide.

The process according to this invention permits production of nicotinamide without intermediate formation of nicotinic acid or a nicotinic ester or salt which heretofore has been considered necessary, thus the new synthesis, by eliminating intermediate operations, results in more economical production of the desired material than has hitherto been considered commercially expedient.

The following example illustrates a method of carrying out the present invention, but it is to be understood that this example is given by way of illustration and not of limitation.

Example

Approximately 10.4 g. (0.1 mol) of β-cyanopyridine are dissolved in about 50 cc. of water and 4 cc. of sodium hydroxide solution (6 N). Approximately 200 cc. of aqueous hydrogen peroxide (6%) are slowly added to the mixture, with agitation, and the temperature is maintained at about 45° C. throughout the addition, which requires about an hour. Oxygen is evolved. After cooling, the mixture is neutralized. The reaction product, nicotinamide, is then separated, preferably by addition of about 15 g. of mercuric chloride dissolved in approximately 300 cc. of acetone, which causes formation of a sparingly soluble nicotinamide mercuric chloride complex. The precipitated complex is removed, washed, dried, suspended with anhydrous sodium carbonate in methanol and hydrogen sulfide is passed into the mixture. After filtering, nicotinamide is recovered from the filtrate by evaporation of the methanol and can be further purified by conventional operations if desired.

Modifications may be made in carrying out the present invention without departing from the spirit and scope thereof and the invention is to be limited only by the appended claim.

What is claimed is:

The process that comprises preparing an alkaline aqueous solution of β-cyanopyridine containing about .24 mole of alkali per mole of β-cyanopyridine, adding to said solution, slowly and with agitation, about 6% aqueous hydrogen peroxide, while maintaining a temperature of about 45° C., continuing the addition of hydrogen peroxide for about an hour and until about 4.8 moles of hydrogen peroxide have been added per mole of β-cyanopyridine, cooling and neutralizing the reaction mixture, and recovering nicotinamide from the neutralized mixture, by adding mercuric chloride to the mixture to precipitate a nicotinamide mercuric chloride complex, separating the precipitate and suspending the same in anhydrous sodium carbonate in methanol, passing hydrogen sulfide into the suspension, filtering, and evaporating the filtrate to obtain nicotinamide.

JACOB van de KAMP.
MAX TISHLER.

REFERENCES CITED

The following references are of record in the file of this patent:

Helvita Chem. Acta, vol. 23 (1943), pp. 358–362.